C. F. KRANING.
ATTACHMENT FOR MINNOW BUCKETS.
APPLICATION FILED JULY 8, 1912.

1,073,353.

Patented Sept. 16, 1913.

Witnesses

Inventor
C. F. Kraning
By
Attorneys

UNITED STATES PATENT OFFICE.

CHARLES F. KRANING, OF NORTH MANCHESTER, INDIANA.

ATTACHMENT FOR MINNOW-BUCKETS.

1,073,353.  Specification of Letters Patent.  Patented Sept. 16, 1913.

Application filed July 8, 1912. Serial No. 708,294.

*To all whom it may concern:*

Be it known that I, CHARLES F. KRANING, citizen of the United States, residing at North Manchester, in the county of Wabash and State of Indiana, have invented certain new and useful Improvements in Attachments for Minnow-Buckets, of which the following is a specification.

This invention is an attachment for minnow buckets and has for its object the provision of simple, inexpensive and efficient means whereby minnows or other small fish may be kept in a fresh condition while being transported from place to place.

The object of the invention is attained in such a device as is illustrated in the accompanying drawings, and the invention consists in certain novel features which will be hereinafter fully described and particularly pointed out in the claim following the description.

Figure 1:
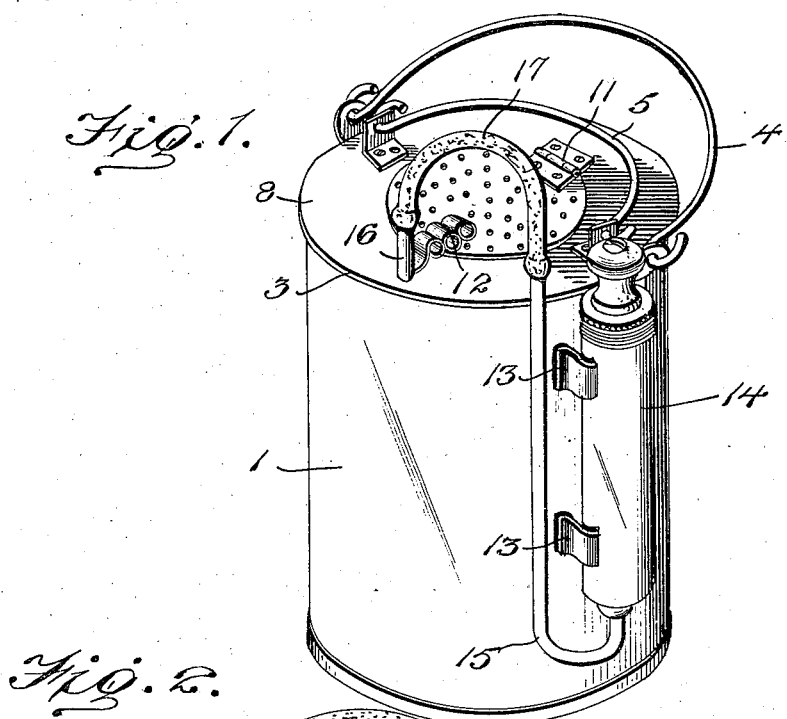
Figure 2:
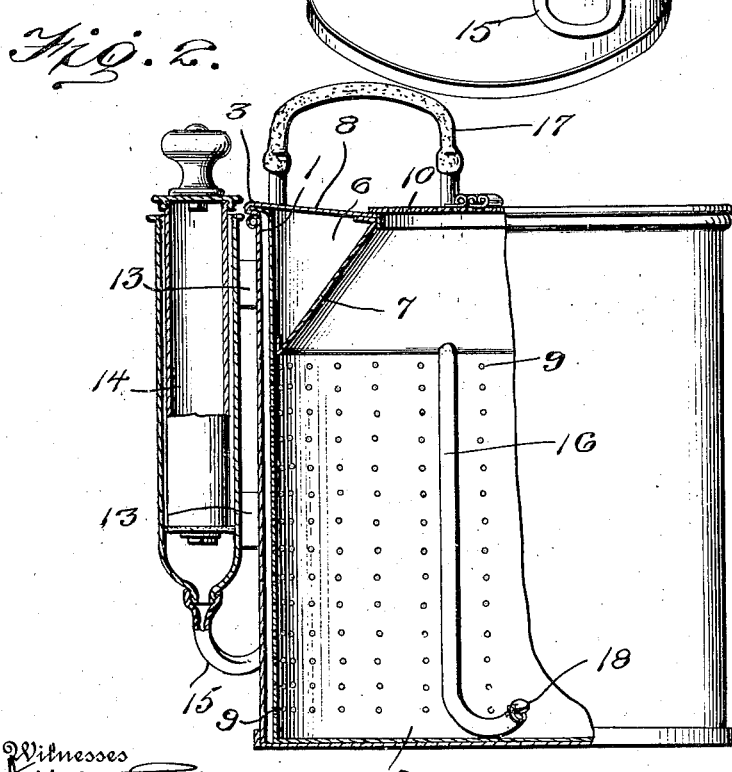

In the accompanying drawings: Figure 1 is a perspective view of a bait bucket having my invention applied thereto; Fig. 2 is a vertical section of the same.

In carrying out my invention, I employ an outer pail or vessel 1 which may be of any convenient form or dimensions. The bait receptacle 2 is of similar form and is sufficiently smaller to fit easily within the outer receptacle or carrier and at its upper end is provided with an outstanding annular flange 3 adapted to rest upon the upper edge of the outer pail or carrier. The outer carrier is provided with a suitable handle 4, and a similar handle 5 is also attached to the top of the bait receptacle, so that, when the user reaches the stream in which the minnows or other small fish are to be used as live bait, the bait receptacle may be removed from the carrier and then placed in the stream. To prevent sinking of the bait receptacle when thus placed in the stream, an air chamber 6 is provided at the upper end thereof, said chamber being formed by means of an upwardly and inwardly projecting partition or annular plate 7 which has its lower edge formed with or rigidly secured to the outer wall or body of the receptacle and has its upper inner edge formed or rigidly united with the inwardly projecting annular rim or cover 8 of the receptacle. The space inclosed by the outer wall, the partition and the cover constitutes a dead air chamber whereby buoyancy will be imparted to the receptacle so that it may be placed within the stream without any fear of its sinking. Below the partition 7, the wall of the receptacle is perforated, as indicated at 9, so that the running water may circulate through the receptacle, whereby the fish in the receptacle will be maintained in their natural condition. The bait receptacle is provided with the usual perforated lid 10 which is hinged at one side to the cover 8, as indicated at 11, and is provided at an opposite point of its edge with a latch 12 which may be of any convenient construction.

Upon the outer wall of the carrier 1, I provide rigid brackets 13 to which is secured an air pump 14, and from the lower end of this air pump a pipe or tube 15 extends upwardly along the carrier so as to project slightly above the upper end thereof, said pipe or tube being soldered or otherwise rigidly secured to the carrier. A similar tube or pipe 16 extends downwardly through the top 8 and the partition 7 of the bait receptacle close to the side wall of the said receptacle and has its lower end turned inwardly and terminating at or about the center of the said receptacle so that air passing therethrough will rise through the water in the receptacle and will supply the oxygen necessary to purify the water and keep the bait alive. A flexible hose or coupling tube 17 is fitted on and extends between the upper ends of the air tubes 15 and 16, so that, when the air pump is manipulated, fresh air will be forced through the said tubes into the receptacle, as will be readily understood. It may sometimes happen that the force of the suction on the up-stroke of the pump piston will draw water from the receptacle into the cylinder of the pump and to avoid such an occurrence a valve 18 of any convenient or preferred design may be supplied at the discharge end of the tube 16, as will be readily understood.

The device is exceedingly simple in the construction and arrangement of its parts and may be readily operated by anyone. The outer vessel or carrier is partly filled with water and the minnows or other small fish are placed in the bait receptacle, after which said receptacle is slipped down into the outer carrier and the air tubes are connected by the flexible coupling tube 17, as will be readily understood. A few strokes of the air pump, occasionally, will supply fresh air to the fish so that the water will be purified and the fish kept alive and in good condition until the fisherman reaches the stream where the bait is to be used. The bait receptacle may be then removed from the carrier and placed in the stream so that the bait will be in their native element until removed by the fisherman.

The device will not only be found of great service to fishermen but will also be found advantageous for use in transporting small fish from hatcheries to streams which are to be stocked.

What I claim is:—

A bait bucket comprising an imperforate carrier, a bait receptacle fitting within the carrier and supported by the upper edge thereof, said receptacle having a foraminous lower portion and having a float at its upper end, an air tube disposed within the bait receptacle against one side thereof and having its upper end extending through the float and projecting above the receptacle and its lower end extending inwardly over the bottom thereof, an air pump secured externally upon the carrier, an air tube leading from said pump and having its end projecting above the top of the carrier, and a flexible tube connecting and detachably fitted upon the upper ends of the two air tubes.

In testimony whereof I affix my signature in presence of two witnesses.

CHARLES F. KRANING. [L. S.]

Witnesses:
 FOREST R. BEARE,
 HUGH E. NEER.